Nov. 12, 1935.　　　　　O. B. JACOBS　　　　　2,020,317
TRANSMISSION AND REPEATER SYSTEM
Filed Feb. 27, 1934　　　4 Sheets-Sheet 1

INVENTOR
O. B. JACOBS
BY
ATTORNEY

INVENTOR
O. B. JACOBS
BY
ATTORNEY

Nov. 12, 1935.   O. B. JACOBS   2,020,317
TRANSMISSION AND REPEATER SYSTEM
Filed Feb. 27, 1934   4 Sheets-Sheet 4

INVENTOR
O. B. JACOBS
BY
ATTORNEY

Patented Nov. 12, 1935

2,020,317

UNITED STATES PATENT OFFICE 2,020,317

TRANSMISSION AND REPEATER SYSTEM

Oliver B. Jacobs, Morristown, N. J., assignor to Bell Telephone Laboratories, Incorporated, New York, N. Y., a corporation of New York Application February 27, 1934, Serial No. 713,239

11 Claims. (Cl. 178—63)

The present invention relates to amplifying repeaters for transmission lines, and particularly to such repeaters using space discharge devices with heated cathodes.

The invention has particular reference to repeaters located in relatively inaccessible places and adapted to operate for prolonged periods of time without attention. In a typical case, the repeaters may be located under water enclosed in suitable housings and used to amplify signals on a submarine cable. It has been proposed to locate submarine cable repeaters on the sea bottom and to supply all operating current to them over the cable, thus dispensing with batteries which require periodic replacement. With the elimination of the batteries, the period of operation of the repeater without attention is greatly prolonged and will probably be limited in practice principally by the life of the discharge devices. It is desirable, of course, to provide repeaters which will operate without attention for the entire useful life of the cable.

The present invention, while capable of more general application, is specifically directed to increasing the period of useful life of repeaters adapted for use in submarine cable systems of the type discussed above.

An object of the invention is a repeater circuit whose probable useful period of operation is greater than that of the individual space discharge devices employed in it. Thus in an installation employing one or a large number of repeaters, the system may continue in use after the failure of a portion of the discharge devices without replacement of the tubes that are out of service, and the liability of failure of the system by failure of individual discharge devices may be greatly diminished. This is accomplished in accordance with the invention without the employment of moving parts or with a minimum of moving parts.

In accordance with a specific embodiment of the invention to be described more fully hereinafter, a plurality of tubes is used in each repeater stage, each tube being capable of functioning without the other or others in the same stage, and each tube cathode being energized by the same series current. Loss of activity of one tube does not put the system out of service because one or more other tubes continue to repeat the signals for that stage. With either filamentary or heater type tubes a shunt resistor is brought in which maintains the series cathode-heating circuit in the event that any heating element becomes open-circuited. In the case of heater-type tubes there may be less necessity for use of the shunt resistors since the heaters are probably less liable to become open. In this type of tube the limitation to useful tube life may be the diminishing activity of the cathode.

The nature of the invention and its various objects and features will be more fully understood from the following detailed description taken in connection with the accompanying drawings in which.

Figure 1:
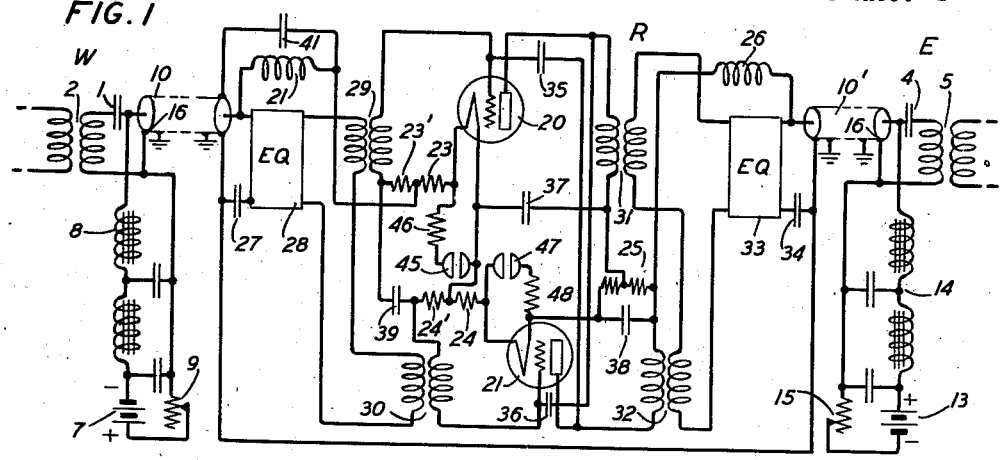
Fig. 1 is a simplified circuit diagram of a submarine cable system including a repeater in accordance with the invention.
Figure 1A:
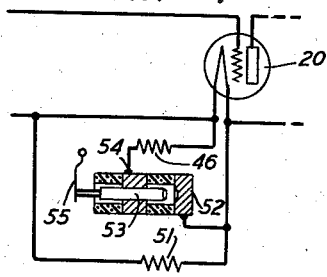
Figs. 1A and 1B show detail modifications of the repeater of Fig. 1.
Figure 1B:
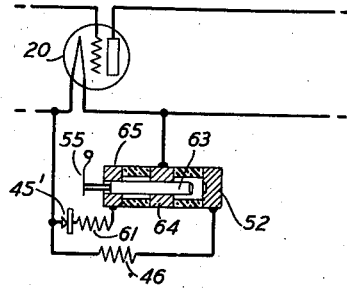

Referring to Fig. 1, there is shown in simple diagrammatic form a submarine cable system comprising west and east terminal stations W and E and an intermediate repeater station R which may be one of several repeaters included between terminal stations W and E and located at intervals along the cable 10. The repeater circuit R is assumed to be included in a suitable casing, not shown, capable of withstanding sea bottom pressure and of excluding all moisture from its interior and suitably united mechanically to the structure of the cable sections between which it is inserted so that it may be laid and, if necessary, recovered with the cable.

The repeater circuit R and the other similar repeaters, if any, are adapted to be supplied with energizing current over the cable from the terminal stations or one of them. For this purpose there is shown located at station W a source of direct current 7 which may be a battery or other suitable source and at station E another source 13, these two sources being shown as poled to aid each other in transmitting direct current over the cable 10 between its core and return conductor 16 which is in contact with ground. Variable resistances 9 and 15 enable the magnitude of the direct current to be controlled.

It is assumed that the cable 10 transmits signals in the direction of west to east. The signals of the west station are impressed on any suitable terminal circuit, not shown, through a repeating coil 2 and condenser 1 between the cable core and the return conductor or ground 16. Conversely, at the east station E the signals received over the cable 10 pass through condenser 4 into repeating coil 5 by which they are impressed on any suitable receiving circuit, not shown. Filters 8 and 14 permit the direct current to flow over the cable, but prevent the signals from being shunted materially by the power supply circuits. The signals may be of any character desired. For example, they may comprise speech, but preferably in order to use the cable to best advantage they will comprise a number of modulated carrier waves of different frequencies each carrying a separate conversational current or other signal. As an illustrative example, the signals may comprise ten carrier speech channels occupying the total range between 6 kilocycles and 40 kilocycles received from one or a plurality of telephone lines at the station W and passing into one or a plurality of telephone lines at the station E.

Referring more particularly to the repeater circuit R, this may comprise a pair of space discharge devices 20 and 21 associated in push-pull relation to amplify signals received over cable section 10 and impress them in amplified form on cable section 10'. These tubes are shown as supplied with filament heating current, anode voltage and grid bias voltage from the direct current passing over the cable. Current from the positive pole of battery 13 at station E flows through the inductances of filter 14, over the core of cable section 10' to the repeater station, then through retard coil 26, resistance 25, cathode of tube 21, resistance 24, cathode of tube 20, resistance 23, retard 21 to the core of cable section 10, thence over the cable to the west station and through inductances of filter 8 to the negative pole of source 7. The circuit is completed through variable resistance 9 and the return conductor 16 to the east station and through variable resistance 15 to the negative pole of source 13. In Fig. 1 it is assumed that the return conductor 16 is in contact with ground and sea water so that the return current flows partly through these media.

This current heats the filaments of the tubes 20 and 21 and also supplies positive voltage to the anodes of the two tubes and negative voltage to the grids. The positive anode voltage for the tube 21 is derived from the resistance 25 and that for the tube 20 is derived from the left-hand portion of resistance 25 in series with the resistance of the cathode of tube 21 and resistance 24. Negative grid bias for tube 21 is derived from the potential drop through the resistance 24 through which the direct current flows as previously traced while the negative grid bias for tube 20 is derived from the analogous resistance 23.

The signal currents at the repeater station received from station W pass through the equalizer 28 in series with condenser 27 and then through the primary winding of input coils 29 and 30, the secondaries of which are respectively connected in the input circuits of tubes 20 and 21. The amplified signals in the outputs of tubes 20 and 21 pass through output coils 31 and 32, equalizer 33 and condenser 34 into the outgoing cable section 10'. The windings of input coils 29 and 30 preferably will be placed on a single core, and a second core preferably will serve for the windings of output coils 31 and 32.

Resistances 23' and 24' prevent singing at very high frequencies which otherwise would occur under certain conditions when tubes having a high amplification factor are used in a circuit designed for push-pull operation. In such cases singing may occur in parallel in the two sides of the amplifier, in contrast to normal push-pull operation, at some frequency at which the input and output impedances on a parallel circuit basis are high. Resistances 23' and 24' are effective in suppressing parallel singing, but are prevented from materially affecting push-pull operation by being shunted by condenser 39.

Condensers 37 and 38 are by-pass condensers for the resistance from which the plate drop is derived for the respective tubes 20 and 21. For a high impedance circuit these condensers may be omitted with negligible effect on amplifier performance. Condensers 35 and 36 are for the purpose of neutralizing the inter-electrode tube capacity of the tubes 20 and 21, the type of neutralizing circuit illustrated being well known in the high frequency signaling art. Condenser 41 cooperates with retard coils 21 and 26 to form a filter to prevent signaling energy impressed on cable 10' from passing through the filament path to the input side and causing distortion or singing. It is not necessary to have two separate retards, but if either is omitted it is necessary to omit condenser 41 as well, and to have a greater inductance in the remaining retard than the total inductance of the two retards when used with condenser 41.

With the repeater R energized in the manner that has been described, the tubes 20 and 21 together with their associated circuits operate as a push-pull amplifier inserted between the cable sections 10 and 10'. Equalizers 28 and 33 of which the latter may be omitted in some cases, are designed to compensate for the unequal attenuation of the cable over the transmission frequency range. To do this they cooperate with the other parts of the amplifier to give the latter a frequency-amplitude characteristic substantially the inverse of that of the cable.

It will now be assumed that after a period of service one of the two tubes 20 or 21 fails as, for example, by having its filament burn out. This will momentarily open the direct current circuit previously traced from source 7 to source 13 at the respective terminal stations. In the case of a long cable circuit crossing an ocean for example, each terminal source 7 and 13 may have a terminal voltage of the order of 1000 volts or more. Even in a relatively short cable circuit containing only a single intermediate repeater R the terminal voltage of the direct current supply source may be several hundred volts. When the direct current circuit is opened by the burning out of a tube filament, for example, that of tube 20, the potential across the small gap 45 builds up to the point at which the gap breaks down and closes the direct current path through resistance 46, which has the same resistance as the filament of tube 20. This gap 45 is assumed to be a low voltage breakdown spark gap with means for closing the circuit metallically upon operation, as, for example, two carbon electrodes having a low melting point metal plug inserted in one or both in such a way that the metal will flow across the gap when sufficient heat is generated by a discharge. Low voltage breakdown gaps of this type are known in the art.

After the substitution of resistance 46 for the filament of tube 20 as above described, the repeater R no longer functions as a push-pull repeater since the tube 20 is now inoperative, but continues to function as a single tube repeater comprising amplifying tube 21. That is, the signals received over the cable section 10 pass through the equalizer 28 and repeating coil 30 to the input side of tube 21, the amplified output of which passes through output coil 32, equalizer 33, etc. to the cable section 10'. The operating conditions for tube 21 are the same as heretofore, and the tube may, therefore, be assumed to have as long a useful life whether tube 20 is operative or not. If tube 21 instead of tube 20 burns out, spark gap 47 and resistance 48 cooperate in the same way as described above for spark gap 45 and resistance 46 to enable the tube 20 to continue to function.

It was stated above that the amplifier circuit of repeater R is normally a push-pull amplifier which means that the signal potentials appear at the two grids at any instant in opposite phase and also are in opposite phase at a given instant on the two plates. While the push-pull arrangement is preferred, it is not necessary in accordance with the present invention that the two tubes operate in push-pull, but they may be operated in parallel. For this purpose the phase of one of the input transformers and of the corresponding output transformer may be reversed so that the signal potentials are on both grids in the same phase and on both plates in the same phase.

An alternative way of substituting a resistance for a burnt out filament is disclosed in Fig. 1—A. The tube in question, which may be the tube 20 of Fig. 1, has normally shunted across its filament a heat coil 51 of such high resistance that a negligibly small current flows through it when the filament of the tube is intact. When the filament of the tube burns out, however, sufficient voltage is applied to the heating winding 51 to heat up the elements 52, 53, 54. The element 53 is a small plunger normally separated from the cup-shaped contact 52, but urged by spring 55 in a direction toward the cup 52. The plunger 53 is held by the close-fitting sleeve or ring 54 from lateral movement by being soldered to the ring 54 by the use of low melting point solder. The end of the plunger 53 is tinned as is also the stationary contact member 52. When a sizeable current flows through the heat coil 51 the solder is melted and the plunger 53 is moved under the force of spring 55 to meet the contact member 52. The heat coil is preferably arranged with more heat dissipating resistance adjacent the member 52 than adjacent the elements 53 and 54 to insure that the solder in the contact 52 is fused at least as soon as the solder in the ring 54. As soon as the plunger 53 makes contact with 52, the heater coil 51 is shunted out by the resistance 46 so that the heater now cools off and allows the solder to harden.

An alternative form of substitution circuit is disclosed in Fig. 1—B, in which a relatively low resistance heat coil 61 is connected in series with low voltage breakdown device 45' across the filament terminals when plunger 63, as normally, makes soldered contact with stationary contact member 65. If the filament now burns out sufficient voltage is applied to break down the device 45' and permit heating current to flow through the heater 61. This raises the temperature of the elements 63, 64, 65 and 52 so that the plunger is released from the ring 64 and contact 65 and allowed to move to the right in the figure under the pressure of spring 55 and make contact with stationary member 52. This breaks the circuit through the heat coil 61 which allows the members to cool off again. With the plunger 63 in its right-hand position the heat coil 61 is permanently removed from the circuit and the substitute resistance 46 is permanently connected in circuit across the terminals of the burnt out filament. The device 45' may comprise an opposed rectifier element, such as a copper oxide rectifier designed to withstand the normal operating voltage but to be broken down and transmit the normal cable current when filament of tube 20 burns out. It will be understood that any other suitable means for substituting a resistance for a burnt out filament may be used, the means shown in Figs. 1, 1—A and 1—B being illustrative of types that are at present preferred.

Figure 2:
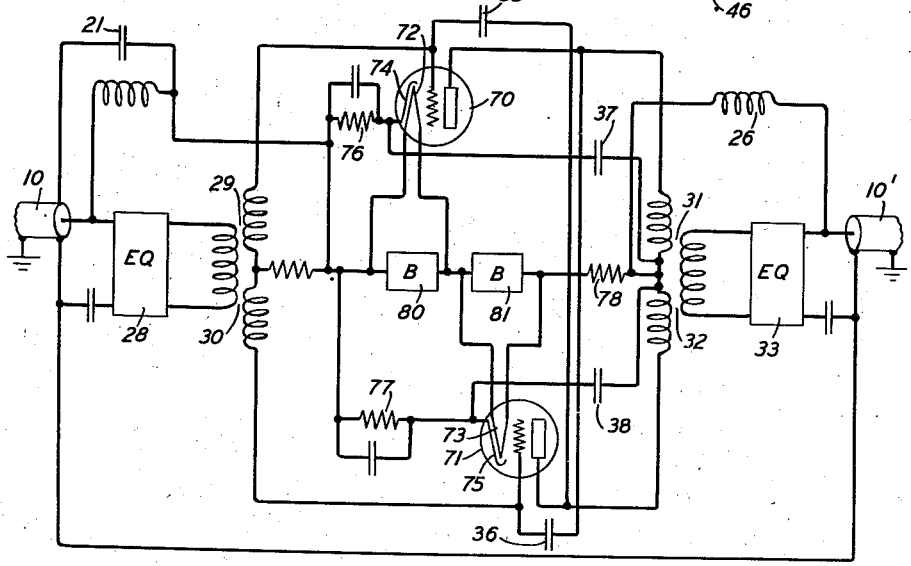
Figs. 2, 3, 4 and 7 show various forms of repeater circuits.

Fig. 2 shows a circuit which differs from the repeater circuit of Fig. 1 principally in the fact that Fig. 2 uses heater type tubes in place of the filamentary cathode tubes of Fig. 1, and Fig. 2 derives negative grid bias for the tubes from a plate circuit resistor instead of from a resistance carrying cathode-heating current. It will be observed that the general lay-out of the circuit of Fig. 2 is similar to that of Fig. 1. The tubes 70 and 71 have cathodes 74 and 75, respectively, and heaters 72 and 73, respectively. The direct current passing over the cable flows in series through the two heaters which heat the cathodes 74 and 75. The rectangles 80 and 81 are assumed to enclose suitable means for substituting a resistance for a heater in case the heater becomes open-circuited. These devices may be the same as shown in Figs. 1, 1—A, or 1—B or any other suitable device for accomplishing this purpose.

The resistance of the heater elements 72 and 73 may be made considerably larger than that of the filaments of tubes 20 and 21. The resistance of the two heaters in series may be sufficiently high to provide plate potential for the tubes by the potential drop in the heaters or, as illustrated in Fig. 2, a resistance 78 external to the heater may be used in series to bring the plate voltage up to the required amount. The grid bias resistors are shown at 76 and 77 each preferably, although not necessarily, shunted by a condenser.

Direct current received over the cable section 10' of Fig. 2 passes through retard coil 26, plate resistor 78, heaters 73 and 72 in series, retard 21 and to cable section 10. The cathodes 74 and 75 are connected through respective grid bias resistors 76 and 77 to the negative end of the heater 72. The space current for the tube 70 passes through resistance 76 and similarly the space current for tube 71 passes through resistance 77, thus developing negative grid bias potentials. In the case of Fig. 2, assuming that the two tubes have identical characteristics and that no signals are applied, both cathodes 74 and 75 are at the same direct current potential as are also both anodes. The cathodes 74 and 75 are assumed to be coated with a suitable material for enabling them to emit electrons efficiently. If after continued use the emissivity of either cathode falls below an effective working value and impairs the operation of the tube, the other tube can still continue to function to repeat signals assuming that it is operative. If the heater of either tube burns out the substitution resistance mechanism 80 and 81 comes into play as described in connection with Fig. 1 to substitute a resistance of equal value. Resistance 123 acts to prevent parallel singing as described above in connection with resistances 23' and 24'.

Figure 3:
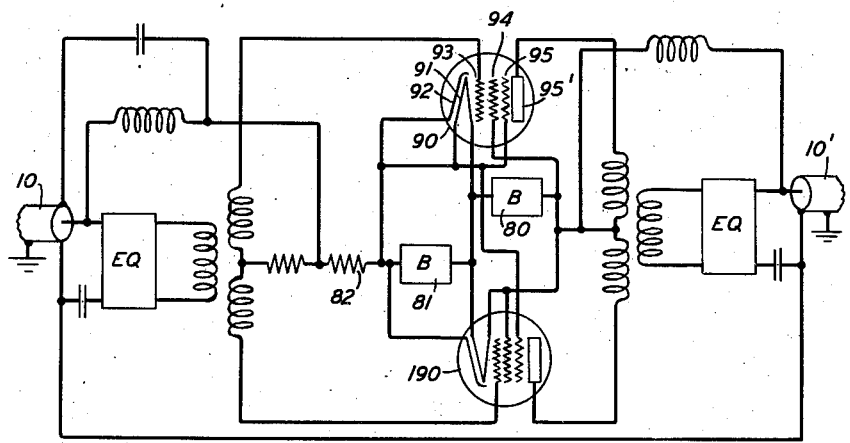

The circuit of Fig. 3 differs from that of Fig. 2 principally by the use in Fig. 3 of pentode tubes. Also, the negative grid bias potential in the circuit of Fig. 3 is derived from cathode heating current although it could just as well be derived from plate current as in Fig. 2 and conversely the circuit of Fig. 2 could be modified as in Fig. 3 to derive the grid bias voltage from the cathode heating current.

Tube 90 of Fig. 3 comprises a heater element 91, a cathode 92, a control grid 93, a space charge grid 94, a screen grid 95 and an anode 95'. Tube 190 has corresponding elements as shown. In a tube of this type the grid-to-plate capacity may be sufficiently small in some cases to permit omitting the neutralizing condensers 35 and 36 of the previous figures. It is assumed in Fig. 3 that the two heaters in series provide sufficient IR drop to give the desired anode voltage and therefore no external resistance is included for this purpose. The burn-out devices 80 and 81 may be the same as in Fig. 2. The resistance for providing negative grid bias is shown at 82. As previously stated, this resistance is included in the series path through which the cathode heating current flows.

Figure 4:
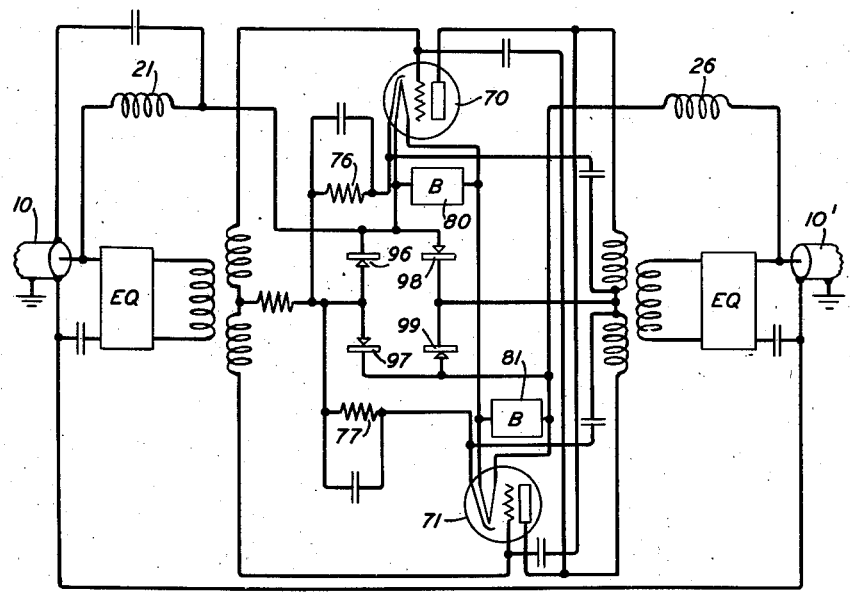

In Fig. 4 the circuit is generally similar to that of Fig. 2 except for the addition of the four unidirectional conducting elements 96, 97, 98 and 99 which may conveniently be copper oxide rectifiers or similar devices having a valve action permitting current to flow only in one direction through them. By using these devices as in Fig. 4, the direct current on the cable for energizing the repeater may flow, in either direction and still make the repeater operative. In order to do this the plates of the tubes 70 and 71 must always be at positive potential with respect to their cathodes and if the grid bias resistors 76 and 77 are used as shown, the drop through these must be such as to make the grids negative with respect to the cathodes. In the circuit of Fig. 4 it is assumed that the resistance 78 of Fig. 2, if any is required, has been included in series with the two heater elements, preferably between the two.

Assuming first that the cable 10' is positive with respect to the cable 10, the path for current flow from positive toward negative, will be through retard 26, heater elements of tube 71 and tube 70 in series and thence through retard 21 to the cable section 10. The path for the space current flow will be through retard 26, rectifier element 99 through the primary output windings to the plates of tubes 70 and 71, thence through the space paths of the two tubes to their respective cathodes, bias resistors 76 and 77, rectifier element 96 to the negative end of the most negative heater.

If it be assumed that the cable section 10 is positive with respect to 10' the path for the current flow from positive toward negative will be through retard 21, through both heaters in series and thence through retard 26 to cable 10'. The anodes of the tubes 70 and 71 will receive positive potential from the positive end of the heater circuit through rectifier element 98. The space current path continues across the space paths of the tubes to the respective cathodes, then through the bias resistors 76 and 77 and through rectifier element 97 to the negative end of the heater of tube 71.

The circuit of Fig. 4 may be used to advantage in situations where it is desired from time to time to reverse the direction of flow of the direct current over the cable. This may be desirable for test purposes or on account of earth potentials or to secure a suitable negative potential to ground at a point of incipient fault, or in other situations.

Figure 5:
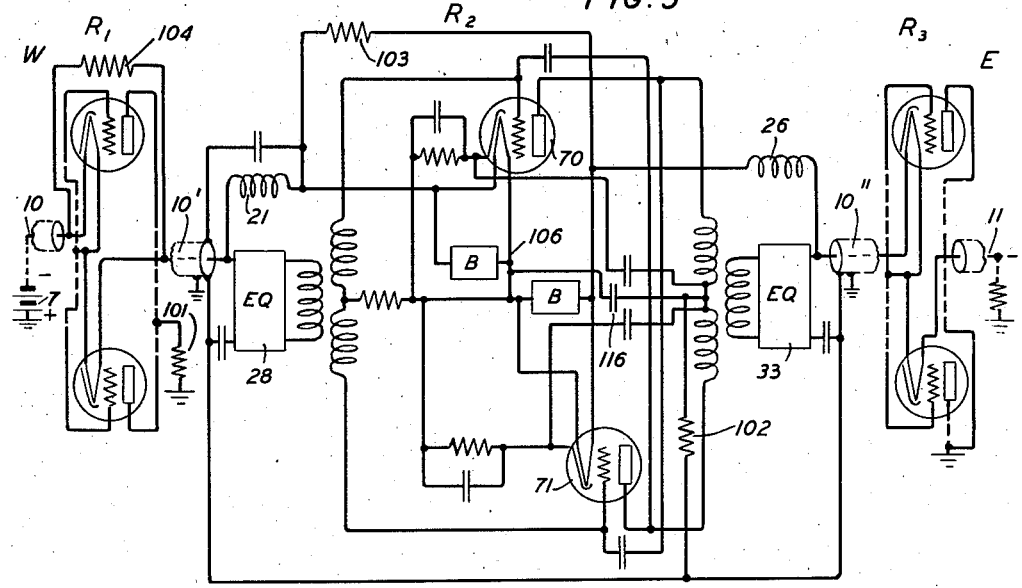
Figs. 5 and 6 show alternative ways of supplying operating voltages to the repeaters.

Referring to Fig. 5 there is shown a fragmentary part of a cable system comprising a west station W including a grounded battery 7 with its negative pole connected to the cable 10 through a suitable filter and having a number of repeater stations of which three are indicated at $R_1$, $R_2$ and $R_3$. The cable is assumed to be grounded through a suitable filter and resistance at the station E. Each repeater station comprises elements specifically shown in station $R_2$ including heater type tubes 70, 71 with input and output equalizers 28 and 33 and input and output retards 21 and 26 arranged substantially as in Fig. 2. The circuit for the heaters is, as in Fig. 2, from cable section 10", assumed to be positive with respect to section 10', through retard 26, both heaters in series and retard 21. Negative grid bias is obtained in the same way as in Fig. 2.

In contrast to the previously described circuits, the circuit of Fig. 5 does not derive plate potential from the potential drop in series resistances in the local repeater circuits, but rather from shunt connections to ground at points along the cable. For example, in the case of the repeater $R_1$ the plate circuits of the repeater are supplied from ground through a relatively large resistance 101. The cathodes of this repeater are negative by the amount of the battery voltage 7 minus the potential drop in the conductor 10 extending from the battery 7 to the cathodes and including whatever resistance there may be in this connection. Since the battery voltage is assumed to be high enough to supply cathode heating current and plate potential drop to a number of repeaters, the cathodes of repeater $R_1$ are more negative with respect to ground than is required for the plate potential of that stage. Resistance 101 is therefore introduced between the plate and ground in order to absorb whatever excess voltage is required to bring the plates at the proper steady voltage with respect to the cathodes.

Considering the repeater circuit $R_2$, the cathodes of this repeater are at a potential represented by the negative pole of the battery reduced by whatever potential drop there is in the cable sections 10 and 10', the heaters of intermediate repeaters such as $R_1$, the heater of tube 70 and such other resistances as are included in this circuit. Resistance 102 which is inserted between the anode circuit and ground in repeater $R_2$ can be smaller than resistance 101 since the cathodes of that repeater are less negative with respect to ground than is the case of repeater $R_1$. The repeater $R_3$ is shown with its anode circuit directly connected to ground since it is assumed, for purposes of illustration, that the potential drop along the cable sections 10, 10' and 10" together with whatever other resistances are included in the circuit leading up to the cathodes of the repeater $R_3$ is just sufficient to make these cathodes negative by the desired amount with respect to ground. It will be understood, of course, that a resistance could also be used in the ground connection for the anodes of repeater $R_3$ where required.

It has been assumed in the foregoing discussion of Fig. 5 that the direct current branch at the distant terminal E contains no battery, but is connected either directly to ground or through a suitable resistance, as shown. It will be apparent from the foregoing discussion, however, that the point E may be at the center of a long cable and that by duplicating the elements present in the circuit of Fig. 5, repeaters similar to $R_1$, $R_2$ and $R_3$ may be inserted between the point E and the distant terminal and that said distant terminal may contain a battery similar to 7 with its positive pole connected to ground and its negative pole connected to the cable. In other words, in such an installation the batteries at both ends of the line would have the same polarity with respect to ground and the cable.

An advantage of the type of connection shown in Fig. 5 is that smaller terminal voltage may be used than for the circuits shown in the previous figures, since the tubes of a repeater need not necessarily utilize as much IR drop in the heaters as is desirable for the plate supply voltage. The battery 7 of Fig. 5 need have only sufficient voltage to supply cathode heating current to all of the repeaters plus the relatively small extra voltage required to overcome the added IR drop in the cable conductor due to the total space current for all of the repeaters. These space currents are cumulative toward the negative end of the cable and suitable resistance in shunt of the heating circuit and specifically shown as by-pass resistances 103 and 104 are provided around the repeaters $R_2$ and $R_1$ decreasing in magnitude as the negative end of the cable is approached since the amount of space current to be passed becomes larger toward that end. The cathodes in each instance preferably are connected to a point between the two heaters rather than to one end of the series circuit comprising both heaters, in order to minimize the difference in voltage between the cathodes and heater elements of the tubes. The resistance in elements 103 and 104 can be incorporated, all or partly, in the burn-out devices B.

Figure 6:
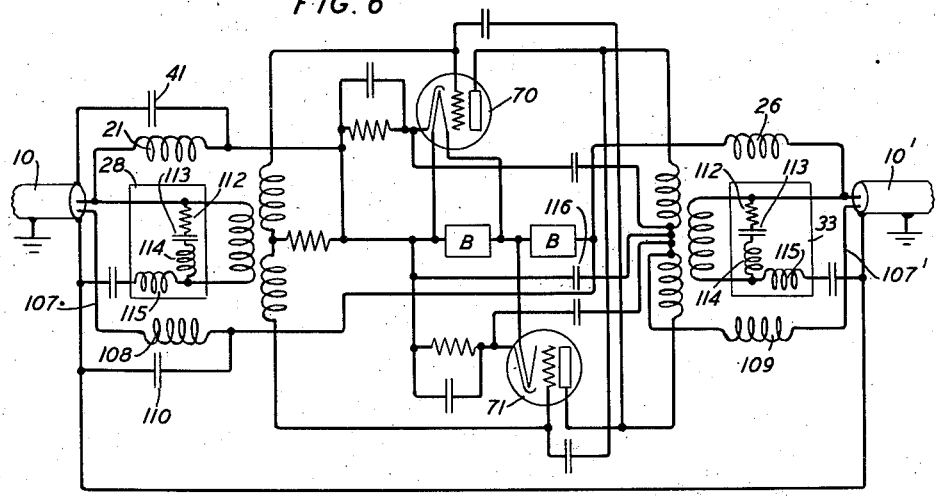
Figure 6A:
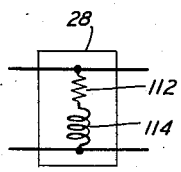
Figs. 6A and 6B show detail modifications of the equalizers of Fig. 6.
Figure 6B:
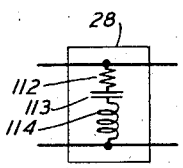

The repeater circuit of Fig. 6 is basically the same as that of Fig. 2, but a different method is used for deriving the plate voltage for the repeater. In the circuit of Fig. 6 the steady plate potential is derived as the potential drop across both of the heaters in series in the particular repeater circuit itself added to the potential drop across the two heaters in series of the next adjacent repeater and the drop in the intervening cable section 10' (except for the very small drop in the extra conductor 107'). It will be noted that the cable sections 10 and 10', each contain a separate conductor 107 and 107', respectively. This extra conductor can be a small gauge conductor suitably disposed in the cable and insulated both from ground and from the cable core. It will be noted that the extra conductor 107 from the cable section 10 leads through a retard coil 108 and is connected to the most positive end of the series heater circuit for the repeater shown. The anode supply circuit of the repeater shown is connected, on the other hand, through a retard 109 to the extra conductor 107' of the cable section 10', this conductor leading similarly to the most positive end of the series heater in the repeater assumed to be to the right of the repeater shown in the figure. Since the cathodes of the tubes 70 and 71 are connected (through their grid bias resistors) to the most negative end of the two heaters of that repeater while their plates are connected by way of conductor 107' to the most positive end of the two series heaters of the next succeeding repeater, the total voltage applied to the anode is the voltage drop across the four heaters in series plus the voltage drop in the cable core in the section 10' between the two adjacent repeaters, minus the drop in conductor 107'. Since conductor 107' carries only space current the potential drop in it is quite small.

This method of supplying anode voltage for the repeaters permits the use of smaller voltage terminal batteries than would be the case in Fig. 2, for example, where the terminal voltage must be sufficient to provide a voltage drop in each repeater circuit sufficient to serve as plate voltage and in addition to make up for the voltage drop on the cable itself. The circuit of Fig. 6 utilizes the drop of potential in the cable and thus permits the elimination of all resistance not needed in the heater circuit for the purpose of heating the cathodes. A condenser 110 may be associated with retard 108 for more effectively filtering signal or other variable voltages away from the lead 107. A similar filter may be used in connection with retard 109. If retard 26 and condensers 41 and 110 are omitted, retard 109 also may be omitted. If retard 21 and condensers 41 and 110 are omitted, retard 108 also may be omitted. As previously stated, whenever a retard coil is omitted, the remaining coil with which it cooperated must have a greater inductance than when both coils are in circuit.

In the various repeater circuits equalizers 28 and 33 have been shown, equalizer 28 being connected on the input side of the repeater and equalizer 33 on the output side. These two equalizers differ from each other partly because of the difference in the impedance looking toward the input and output coils from the equalizers. The equalizer on the output side is useful chiefly in securing an approximately equal change in gain with change in magnitude of energizing current, while the equalizer on the input side may be designed conveniently to cooperate with the parameters of the associated amplifier elements to secure the desired gain vs frequency characteristic. The actual circuits of the equalizers may take any one of a variety of forms. For example, referring to Fig. 6, equalizer 28 is shown as comprising a series inductance 115 and a shunt arm comprising in series a resistance 112, condenser 113 and inductance 114. Output equalizer 33 is shown as being of similar design. The elements of the network comprising the equalizers are proportioned to give the amplifier as a whole a frequency amplitude characteristic bearing an inverse relation to that of the cable so as to enable the complete repeater circuit and an associated section of cable to transmit the desired band of frequencies with substantially zero overall attenuation. Other forms of equalizer are shown in Figs. 6—A and 6—B where either the inductance 115 is omitted or both the inductance 115 and condenser 113 are omitted. The equalizers in Figs. 6—A and 6—B are equally suitable for the input side or the output side of the repeater.

The filter for separating the direct current supplied over the cable from the signaling voltages and comprising retard 21, condenser 41 and retard 26 may comprise a simple filter as shown in Fig. 6 or a plurality of sections each comprising a series retard similar to 21 and a shunt condenser similar to 41. It is to be understood that it is not necessary to interpose a filter between the filament or heater circuit and both of the lines, but that the sole purpose is to prevent outgoing energy from impressing sufficient energy on the input circuit to cause an undesirable feedback effect. If a single retard coil is used on one side or the other of the amplifier proper, a condenser to ground would shunt the line on the side of the retard coil on which the condenser is connected, and therefore the use of a condenser in such a case is impracticable. However, by shunting the coil itself by a condenser so as to form a circuit which is anti-resonant at a suitable frequency, a lower value of inductance may be used in the heater path than otherwise would be required to give equally effective suppression to feedback currents.

Figure 7:
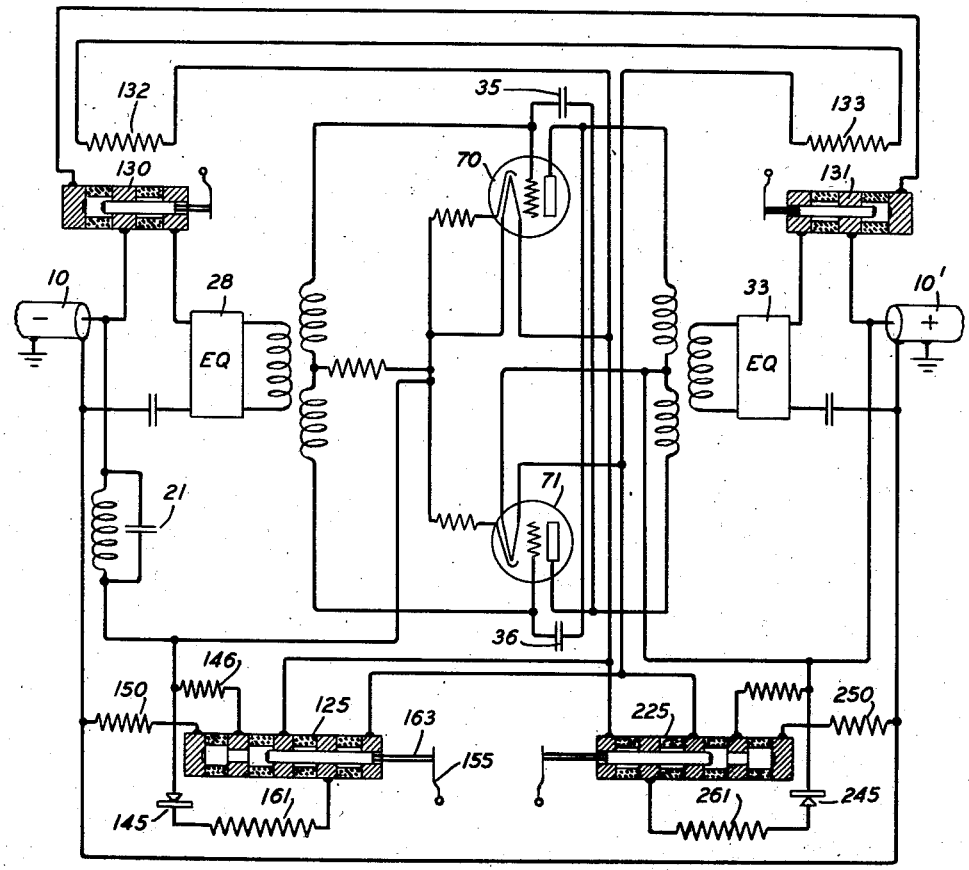

Reference will now be made to Fig. 7, the circuit of which is similar in general to that of Fig. 2 except as will be noted. The two heater-type tubes 70 and 71 are normally connected between cable sections 10, 10' as in Fig. 2, the heating circuit being traceable from cable 10' through heater element of tube 71, first and middle segments of plunger switch 125, heater element of tube 70, retard coil 21, to west cable section 10. The plate voltage is obtained by a connection from the plates to the most positive point in this heating circuit and by a connection of the cathodes to the most negative terminal of the heating circuit through respective bias resistors 76 and 77.

Heat coil 161 in series with rectifier 145 is normally shunted across the heater circuit of tube 70, the element 145 being poled to oppose any current flow through coil 161. If the heater of tube 70 burns out, sufficient voltage is applied across element 145 to break it down to a conducting condition so that heating current flows through coil 161 and heats up the switch 125. When the solder is melted, plunger 163 is forced toward the left by spring 155. At the limit of its movement, the following circuit changes have been made: the circuit through element 145 and coil 161 is broken at the second and middle contacts, so that the switch is allowed to cool off and become fixed in its extreme alternate position from that shown; resistance 146 is shunted across the terminals of heater of tube 70, assumed to be now burnt out; high resistance 150 is connected between the heating circuit and ground. The substitute resistance 146 allows the energizing circuit to be continued through the heater of tube 71 and cable sections 10, 10', and the proper grid and plate voltages to be applied to tube 71 so that it can continue to operate to repeat signals between the cable sections. Grounding the repeater through resistance 150 permits the location of this particular repeater to be determined by suitable testing such as is used in the deep sea cable art to determine location of a fault.

If now the heater of tube 71 should also burn out, switch 225 is operated as a result of current flowing through heater winding 261 and rectifier element 245 in the same manner that has been described for switch 125. Substitute resistance 246 is thus placed across the terminals of the burnt-out heater of tube 71 and high resistance 250 is connected from the heating circuit to ground. This so alters the resistance to ground previously provided by resistor 150 as to enable the location of this repeater to be determined by suitable tests.

Associated with the repeater are two heat-coil-controlled switches 130 and 131, both of which are, however, without effect so long as either switch 125 or 225 is in its normal (shown) position. When both switches 125 and 225 have been actuated to their alternate position, a circuit is closed from cable section 10', substitute resistance 246, fourth and middle contacts of switch 225, heat coils 133 and 132 in series, middle and fourth contacts of switch 125, substitute resistance 146, retardation coil 21 to cable 10'. Current flow through the heat coils 132, 133 heats the switches 130, 131 and allows their plungers to move to their alternate positions. These switches in their normal positions close the series signal-current circuit between respective cable sections and the signal repeating circuit. For example, as shown, the switch contact is in the line branch of the equalizer. When switches 130, 131 are actuated to their alternate positions they open the normal signaling circuit through the repeater and connect a conductor 135 directly across from cable section 10 to 10' thus completely shunting out the repeater apparatus. The resistances 150 and 250 are, however, left connected between the cable cores and ground.

While the different figures have shown both filamentary cathode and heater cathode tubes, it is within the invention to use either or any other suitable type tube in any type of repeater circuit in accordance with the invention. Reference in the claims to unidirectional repeater or amplifier stage is not intended to exclude the use of the repeater to amplify signals sent in both directions over a line or cable. The invention is capable of various modifications within the scope and spirit of the claims.

What is claimed is:

1. In a transmission line system, a repeater in the line including in a single stage thereof a plurality of electron discharge devices having cathodes adapted to be heated, means supplying cathode heating current over said line and to said devices in a series circuit, said current normally heating the plurality of cathodes comprised in said stage, the devices of said one stage being each capable of amplifying signals on said line irrespective of the operative or non-operative condition of another, and means operating in response to the burning out of the hot element in either device for substituting in said series circuit an equivalent resistance, whereby upon failure of the cathode of one device of the stage another device of said stage continues to function and maintain continuous service of said stage for repeating signals in the given direction.

2. In a transmission line system, tandem repeaters at intervals with a section of transmission line between each two repeaters, each repeater including in a single stage thereof a plurality of electron discharge devices having cathodes adapted to be heated, means for transmittin current over said transmission line for heating said cathodes, said current normally heating the plurality of cathodes comprised in one stage of each repeater, the devices of the same stage being each capable of amplifying signals in the same direction on said line irrespective of the operative or non-operative condition of another whereby upon failure of one device of a stage another device in the same stage continues to function and maintain continuous service of said stage for repeating signals in the given direction.

3. A repeater comprising a pair of space discharge devices each having a cathode adapted to be heated by current supplied to cathode-heating terminals, means normally supplying heating current to the heating terminals of said devices in series, two resistors each equal to the resistance included between the heating terminals of a respective device and each connected in series with a point of substantially open-circuit resistance between the terminals of the respective device, and means operative in response to the heating circuit through either device becoming open, to close the respective point of substantially open-circuit resistance thereby connecting the respective resistor across the heating terminals of the device.

4. A repeater according to claim 3 in which said point of substantially open-circuit resistance is a low-voltage breakdown gap comprising terminals of low-temperature fusible material, said material upon breaking down of the gap flowing together to close said gap.

5. A repeater according to claim 3 in which said point of substantially open-circuit resistance comprises terminals held apart by a fusible material, and heating means operable to melt said material and allow the terminals to close, in response to the opening of the heating circuit through the respective device.

6. A repeater circuit comprising a pair of space discharge tubes having cathodes adapted to be heated, grids and anodes, an energizing circuit including resistance comprising the cathode heating circuits of said devices in series, said grids and anodes having connections to points on said resistance for deriving therefrom suitable grid bias and plate voltage, and unilateral elements connected between each end of said cathode heating circuits and said points of connection whereby for whichever polarity of current that is supplied to said energizing circuit the bias voltage derived by said grids is negative and the voltage derived by said anodes is positive with respect to the corresponding cathode.

7. In a transmission system a long line, a source of voltage making one end of the line negative with respect to ground, a repeater intermediate the ends of said line comprising a cathode connected conductively to said line and an anode connected to ground, whereby anode-to-cathode voltage is supplied to said repeater in part via ground from said source.

8. In a transmission system a line having a plurality of repeaters at intervals intermediate its ends, a source of voltage making one side of said line negative with respect to earth at a point to one side of and removed from said repeaters, said repeaters each having a cathode and an anode, said cathodes being each connected to the line at the respective repeater point and the anodes being connected to ground through progressively smaller resistances as said point of negative potential with respect to earth is approached, whereby suitable anode-to-cathode voltages are supplied to said repeaters.

9. In a repeater, a plurality of space discharge devices having anodes, cathodes and heaters for said cathodes, a source of energizing direct voltage, a series circuit comprising said source and said heaters, a connection from said cathodes to the negative terminal of the most negative heater and a connection from the anodes to the positive end of the most positive heater.

10. In a transmission system a line having repeaters at intervals with sections of said line between adjacent repeaters, each repeater comprising a space discharge device having an anode and a cathode adapted to be heated, each device having a cathode heating circuit, a source of direct voltage in series in said line, producing current flow through said line and the cathode heating-circuits of said repeaters and a connection from the anode of one repeater to a point in the line more positive than its own cathode by at least the drop of potential of one of said line sections.

11. In a repeatered line system, a line containing repeaters at intervals with sections of line between repeaters, a terminal of said line having a source of voltage, each repeater comprising a space discharge tube having a cathode adapted to be heated and an anode, a series circuit through said line and the cathode-heating circuits of said repeaters, and means supplying from said source, in addition to the cathode-heating current, over the end section of said line, space current for all of a plurality of said repeaters and over the next section of said line, space current for all but the first repeater of said plurality and so on.

OLIVER B. JACOBS.